(12) United States Patent  
Doi

(10) Patent No.: US 10,322,678 B2  
(45) Date of Patent: Jun. 18, 2019

(54) IN-VEHICLE STORAGE UNIT

(71) Applicant: NIFCO INC., Yokosuka-shi (JP)

(72) Inventor: Atsushi Doi, Yokosuka (JP)

(73) Assignee: NIFCO INC., Yokosuka-shi (JP)

( * ) Notice: Subject to any disclaimer, the term of this patent is extended or adjusted under 35 U.S.C. 154(b) by 0 days.

(21) Appl. No.: 15/567,990

(22) PCT Filed: Mar. 25, 2016

(86) PCT No.: PCT/JP2016/059754  
§ 371 (c)(1),  
(2) Date: Oct. 20, 2017

(87) PCT Pub. No.: WO2016/170919  
PCT Pub. Date: Oct. 27, 2016

(65) Prior Publication Data  
US 2018/0118123 A1 May 3, 2018

(30) Foreign Application Priority Data  
Apr. 24, 2015 (JP) .................. 2015-089426

(51) Int. Cl.  
B60R 7/04 (2006.01)  
B60N 2/75 (2018.01)  
B60N 3/10 (2006.01)  
B60R 16/023 (2006.01)  
G06F 3/044 (2006.01)  
(Continued)

(52) U.S. Cl.  
CPC .................. B60R 7/04 (2013.01); B60N 2/75 (2018.02); B60N 2/793 (2018.02); B60N 2/797 (2018.02); B60N 3/10 (2013.01); B60R 16/023 (2013.01); G06F 3/044 (2013.01); G06F 3/04817 (2013.01); G06F 3/04886 (2013.01)

(58) Field of Classification Search  
CPC .......... B60N 2/797; B60N 2/793; B60N 3/10; B60N 2/75; B60R 7/04  
USPC ................ 296/37.1, 37.8, 37.12, 24.34, 1.09  
See application file for complete search history.

(56) References Cited

U.S. PATENT DOCUMENTS

| 6,091,675 A * | 7/2000 | Lee .................. G11B 17/22 369/30.36 |
| 8,540,297 B2 * | 9/2013 | Browne ................ B60N 3/102 296/24.34 |
| 2008/0094356 A1 * | 4/2008 | Ording ................ G06F 3/04812 345/157 |

FOREIGN PATENT DOCUMENTS

| DE | 10 2011 117 737 A1 | 5/2012 |
| EP | 2 712 766 A1 | 4/2014 |

(Continued)

OTHER PUBLICATIONS

International Search Report dated Jun. 21, 2016 in PCT/JP2016/059754 filed Mar. 25, 2016.

(Continued)

Primary Examiner — Dennis H Pedder  
(74) Attorney, Agent, or Firm — Oblon, McClelland, Maier & Neustadt, L.L.P.

(57) ABSTRACT

An in-vehicle storage unit that can store an item to be stored in a vehicle, and includes: a storing portion that stores an item to be stored; an opening formed in the storing portion; a lid that is formed on the opening, and can be opened and closed; and a touch sensor panel that is formed in a surface of the lid, and can sense a touch operation by an operator. The touch sensor panel displays an operation icon on the touch sensor panel, in accordance with a sensing signal of the touch operation.

8 Claims, 5 Drawing Sheets

(51) Int. Cl.
  *G06F 3/0481* (2013.01)
  *G06F 3/0488* (2013.01)

(56) References Cited

FOREIGN PATENT DOCUMENTS

| JP | 48-33030 | | 4/1973 |
| JP | 6-87387 | A | 3/1994 |
| JP | 7-144566 | A | 6/1995 |
| JP | 2003-159999 | A | 6/2003 |
| JP | 2005-327697 | A | 11/2005 |
| JP | 2006-106851 | A | 4/2006 |
| JP | 2006-240363 | A | 9/2006 |
| JP | 2006-327467 | A | 12/2006 |
| JP | 2011-178258 | A | 9/2011 |
| JP | 2015/068274 | A1 | 5/2015 |

OTHER PUBLICATIONS

Office Action dated Oct. 31, 2017 in Japanese Patent Application No. 2015-089426 (with English language translation), 8 pages.
Extended Search Report dated Nov. 6, 2018 in European Patent Application No. 16782941.5, 11 pages.
Damon Lavrinc: "Chevy Puts a Safe in Your Dash to Stash Your Stuff,", WIRED, Feb. 19, 2013 (Feb. 19, 2013), XP055518149, URL:https://www.wired.com/2013/02/2014-chevy-impala-cubby/.
Jennie Sullivan, "2015 Chevy Tahoe Hidden Compartment", Youtube, May 14, 2014 (May 14, 2014), 1 page., XP054978811, URL:https://www.youtube.com/watch?v=RrWvmeeR1v8.
Caraudiojunkie: "Kenwood eXcelon DNX9980HD 7 Inch Double Din Head Unit", YouTube, Feb. 12, 2012 (Feb. 12, 2012), 1 page, XP54978813, URL:https://www.youtube.com/watch?v=M9iWbl21cVO.

* cited by examiner

IN-VEHICLE STORAGE UNIT

TECHNICAL FIELD

The present invention relates to an in-vehicle storage unit that can store items to be stored inside a vehicle.

BACKGROUND ART

Conventionally, an in-vehicle armrest installed in a vehicle such as a passenger car is equipped with an in-vehicle storage unit that can store small articles brought into the vehicle. Normally, an in-vehicle storage unit includes: a storing portion that stores items to be stored, such as small articles; an opening formed in the storing portion; and a lid that is provided on the opening and can be opened and closed. As the lid is put into an open state, the opening of the storing portion is exposed, and small articles can be stored in the storing portion.

As a mechanism to put the lid into an open state, a "push-open" mechanism is widely employed to allow an operator to push part of the lid and then pull up the lid.

Alternatively, a touch sensor mechanism that allows an operator to touch a touch sensor and causes the lid to automatically enter an open state is employed as a mechanism to put the lid into an open state. Such a mechanism is disclosed in JP-A 2003-159999 (KOKAI) (Patent Literature 1), for example.

In an in-vehicle storage unit disclosed in the literature, a motor (an opening mechanism and a closing mechanism) that opens and closes a lid in accordance with a touch operation by an operator is provided. When a touch operation is performed by an operator while the lid is in a closed state, the lid is automatically retracted inside by the motor and is put into an open state. When a touch operation is performed by an operator while the lid is in an open state, the lid is automatically returned to a closed state by the motor.

CITATION LIST

Patent Literature

Patent Literature 1: JP-A 2003-159999 (KOKAI)

In the in-vehicle storage unit of Patent Literature 1, the touch sensor is exposed, and therefore, an operator might inadvertently perform a touch operation when putting down a beverage into a cup holder or the like. As a result, the lid is unnecessarily opened and closed.

Also, in the in-vehicle storage unit of Patent Literature 1, the touch sensor is located near the lid. Therefore, there is the need to keep a space for the touch sensor, which bites into the space for the storing portion (or lowers space efficiency).

The present invention has been made in view of the above problems, and aims to provide an in-vehicle storage unit that can prevent undesired opening and closing of a lid, and has high space efficiency.

SUMMARY OF INVENTION

The present invention is an in-vehicle storage unit that can store an item to be stored in a vehicle, and includes: a storing portion that stores an item to be stored; an opening formed in the storing portion; a lid that is formed on the opening, and can be opened and closed; and a touch sensor panel that is formed in a surface of the lid, and can sense a touch operation by an operator. The touch sensor panel displays an operation icon on the touch sensor panel, in accordance with a sensing signal of the touch operation.

According to the present invention, an operation icon is displayed on the touch sensor panel in accordance with a sensing signal of a touch operation or after a touch operation serving as a trigger is performed. This prevents a touch operation toward any operation icon on the touch sensor panel in the initial state. Thus, undesired opening and closing of the lid can be prevented, for example. Further, as the touch sensor panel is provided in the surface of the lid, high space efficiency can be achieved.

Before sensing the touch operation, the touch sensor panel preferably displays a main icon on the touch sensor panel, and thus, can sense a touch operation toward the main icon as the touch operation.

In this case, the operation icon is not displayed on the touch sensor panel, even if a finger of an operator touches any portion other than the main icon. Thus, an undesired operation toward the operation icon can be avoided with a higher degree of certainty.

Further, the operation icon preferably includes an opening/closing icon, the lid is preferably connected to an opening/closing mechanism that opens and closes the lid, and the touch sensor panel is preferably connected to a controller that controls the opening/closing mechanism in accordance with a sensing signal of a touch operation toward the opening/closing icon.

In this case, the lid can be automatically opened or closed when an operator performs a touch operation toward the opening/closing icon.

Also, the controller is preferably installed in the lid. In this case, the space efficiency of the in-vehicle storage unit can be further increased.

Also, the touch sensor panel preferably includes a capacitor, and preferably senses a touch operation from a change caused in the capacitance of the capacitor when an operator touches the touch sensor panel with a finger. In this case, a touch sensor panel with a pleasing appearance can be provided.

Further, the operation icon preferably includes an in-vehicle item operation icon, and the touch sensor panel preferably displays a secondary operation icon on the touch sensor panel, in accordance with a touch operation toward the in-vehicle item operation icon.

In this case, the in-vehicle item operation icon and the secondary operation icon are displayed on the touch sensor panel in a stepwise manner, and thus, an operator can perform a desired operation without confusion. Also, display with a pleasing appearance can be provided on the touch sensor panel.

Further, even when the lid is in an open state, the surface of the lid is preferably exposed, and a touch operation toward the touch sensor panel can be performed. In this case, a touch operation can be promptly performed on the touch sensor panel, whether the lid is in an open state or in a closed state.

In this case, the surface of the lid after opening or closing of the lid is preferably substantially parallel to the surface of the lid before the opening or closing of the lid. As a result, even when the lid is in an open state, the touch sensor panel can have excellent operability.

The present invention is also an in-vehicle armrest characteristically including the above described in-vehicle storage unit.

According to the present invention, an in-vehicle armrest can have various kinds of operational functions, without losing the original function of the in-vehicle armrest.

DESCRIPTION OF EMBODIMENTS

The following is a detailed description of an embodiment of the present invention, with reference to the accompanying drawings.

Figure 1:
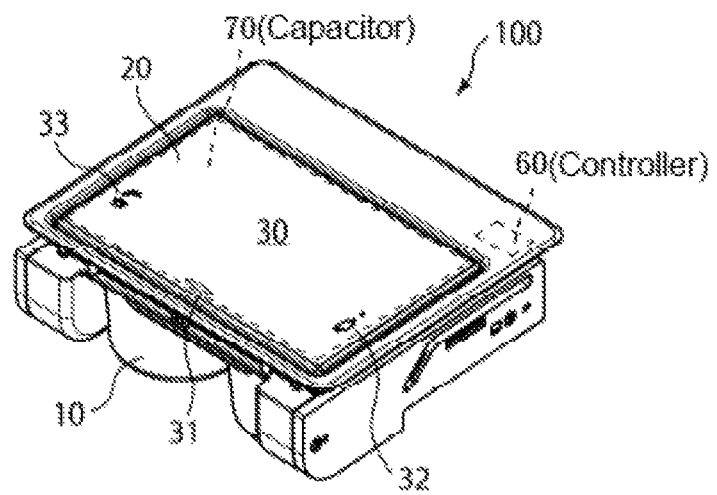
FIG. 1 is a schematic perspective view of an in-vehicle storage unit according to an embodiment of the present invention in a case where the lid is in a closed state.
Figure 2:
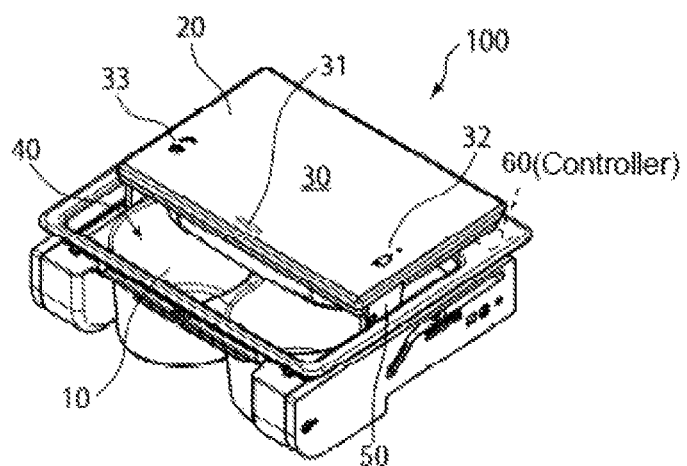
FIG. 2 is a schematic perspective view of the in-vehicle storage unit shown in FIG. 1 in a state where the lid is shifting from the closed state to an open state.
Figure 3:
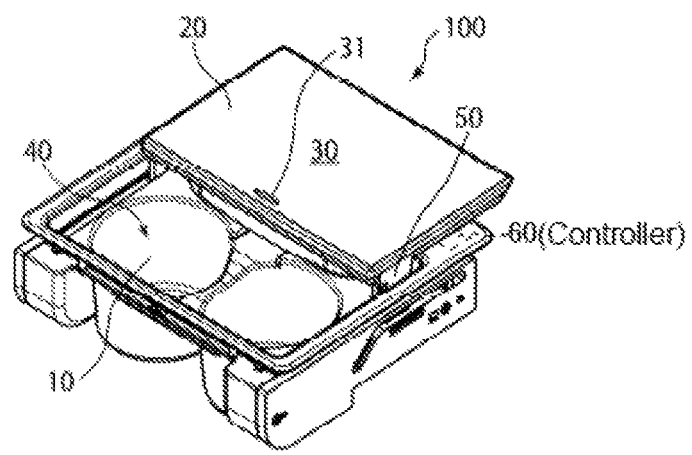
FIG. 3 is a schematic perspective view of the in-vehicle storage unit shown in FIG. 1 in a case where the lid is in the open state.

FIG. 1 is a schematic perspective view of an in-vehicle storage unit 100 according to an embodiment of the present invention in a case where a lid 20 is in a closed state. FIG. 2 is a schematic perspective view of the in-vehicle storage unit 100 shown in FIG. 1 in a state where the lid 30 is shifting from the closed state to an open state. FIG. 3 is a schematic perspective view of the in-vehicle storage unit 100 shown in FIG. 1 in a case where the lid 30 is in the open state.

As shown in FIGS. 1 to 3, the in-vehicle storage unit 100 of this embodiment includes: a storing portion 10 that stores an item to be stored; an opening 40 formed in the storing portion 10; and the lid 20 that is provided on the opening 40 and can be opened and closed. The in-vehicle storage unit 100 of this embodiment is supposed to be mounted in an in-vehicle armrest, and the lid 20 has a rectangular shape in a planar view. In the storing portion 10, two round-bottomed cylindrical cup holders suitable for storing beverage cups or plastic bottles are further provided on the right and left sides (along a long side of the lid 20).

Also, as shown in FIGS. 1 to 3, a touch sensor panel 30 that can sense a touch operation by an operator is provided in the surface of the lid 20. The touch sensor panel 30 of this embodiment includes a capacitor 70, and senses the touch operation from a change caused in the capacitance of the capacitor 70 when the operator touches the touch sensor panel 30 with a finger. It should be noted that a backlight using LED lighting is employed as the touch sensor panel 30 of this embodiment.

Further, the touch sensor panel 30 of this embodiment displays operation icons on the touch sensor panel 30 in accordance with a sensing signal of the touch operation. Specifically, before sensing the touch operation, the touch sensor panel 30 of this embodiment displays an oval main icon 31 on the touch sensor panel 30, as shown in FIGS. 1 to 3, and can sense a touch operation toward the main icon 31 as the touch operation. In accordance with a sensing signal of the touch operation toward the main icon 31, an opening/closing icon 32 and an in-vehicle item operation icon 33 shown in FIGS. 1 and 2 are simultaneously displayed as operation icons on the touch sensor panel 30.

In this embodiment, the opening/closing icon 32 is an icon shaped like a cup, and is displayed on the left side. The in-vehicle item operation icon 33 is an icon shaped like a light and a seat, and is displayed on the right side. In this embodiment, the main icon 31 is dimmed while these operation icons are displayed. Displaying of the opening/closing icon 32 and the in-vehicle item operation icon 33 is continued for 20 seconds, for example.

In this embodiment, the lid 20 including the touch sensor panel 30 is connected to an opening/closing mechanism 50 that opens and closes the lid 20, and the touch sensor panel 30 is connected to a controller 60 that controls the opening/closing mechanism 50 in accordance with a sensing signal of a touch operation toward the opening/closing icon 32. In such a structure, the opening/closing mechanism 50 can automatically open and close the lid 20 when an operator performs a touch operation toward the opening/closing icon 32. The controller 60 of this embodiment is installed in the lid 20.

Further, the controller 60 of this embodiment has a fail-safe function to increase security in opening and closing the lid 20. When sensing contact of the lid 20 with an obstacle while the lid 20 is being opened or closed, the controller 60 suspends the opening/closing operation of the lid 20, and returns the lid 20 to the original state.

Also, in this embodiment, when the lid 20 is made to shift from the closed state (see FIG. 1) to the open state (see FIG. 3), the lid 20 is made to slide diagonally upward (see FIG. 2) while the surface of the lid 20 is maintained horizontally (without tilting), and further slide rearward (in the direction from lower left toward upper right in FIG. 2). Therefore, the surface of the lid 20 after opening or closing of the lid 20 is parallel to the surface of the lid 20 before the opening or closing of the lid 20, as shown in FIGS. 1 to 3. Because of this, a touch operation toward the touch sensor panel 30 can be performed even when the lid 20 is in the open state in the in-vehicle storage unit 100 of this embodiment.

The touch sensor panel 30 of this embodiment also displays secondary operation icons 34 (see FIG. 9) on the touch sensor panel 30, in accordance with a touch operation toward the in-vehicle item operation icon 33.

Figure 9:
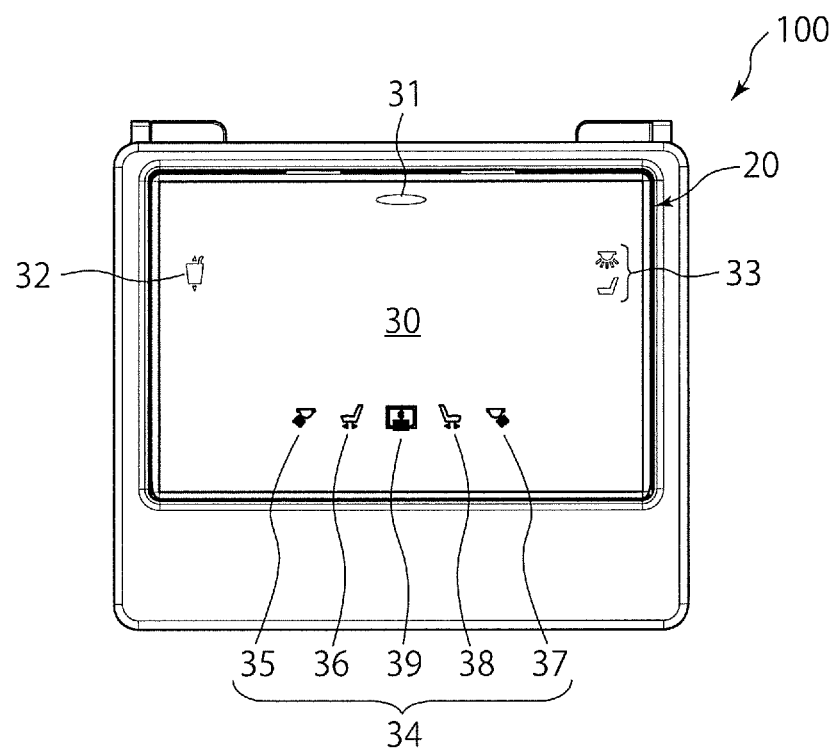
FIG. 9 is a diagram showing a state where secondary operation icons are displayed on the touch sensor panel in the in-vehicle storage unit shown in FIG. 1.

The secondary operation icons 34 of this embodiment are a left-side light operation icon 35, a left-side seat operation icon 36, a right-side light operation icon 37, a right-side seat operation icon 38, and a sunshade operation icon 39, as shown in FIG. 9.

Referring next to FIGS. 4 to 11, the functions of the in-vehicle storage unit 100 of this embodiment are described.

Figure 4:
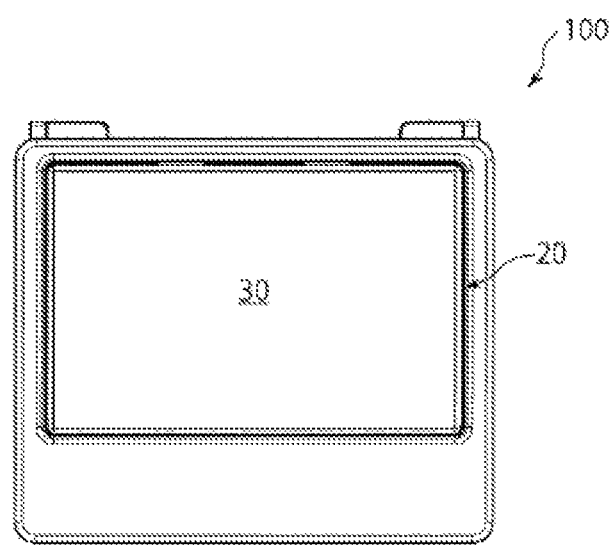
FIG. 4 is a plan view of the in-vehicle storage unit shown in FIG. 1 in the initial state.
Figure 5:
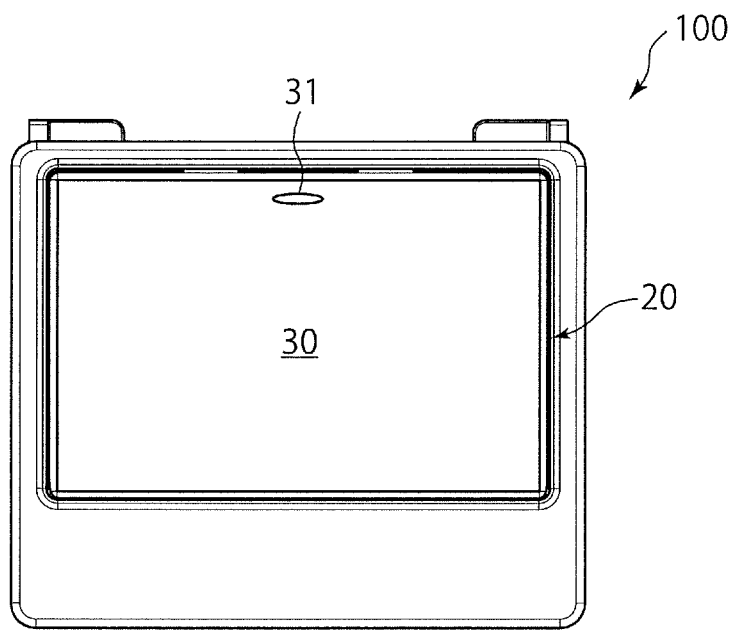
FIG. 5 is a diagram showing a state where a main icon is displayed on touch sensor panel in the in-vehicle storage unit shown in FIG. 1.
Figure 6:
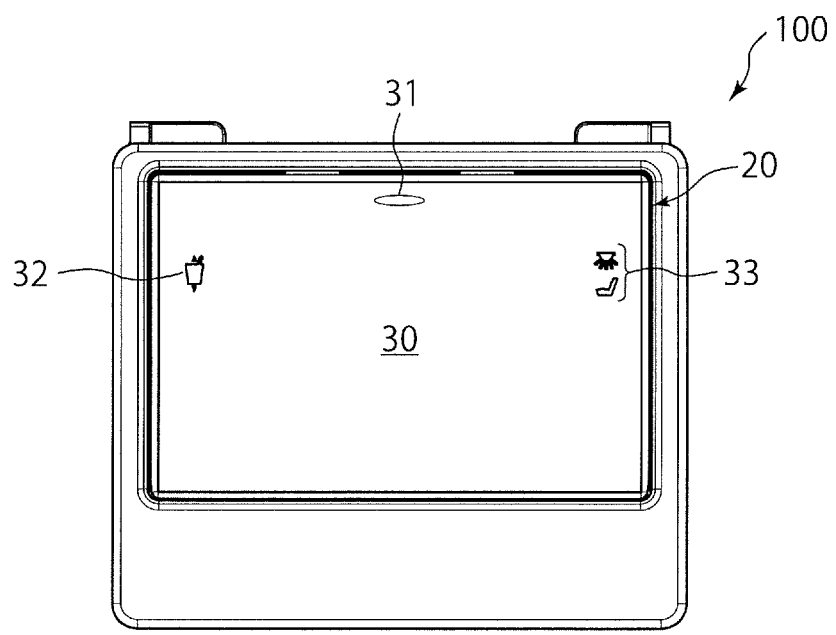
FIG. 6 is a diagram showing a state where an opening/closing icon and an in-vehicle item operation icon are displayed on the touch sensor panel in the in-vehicle storage unit shown in FIG. 1.
Figure 7:
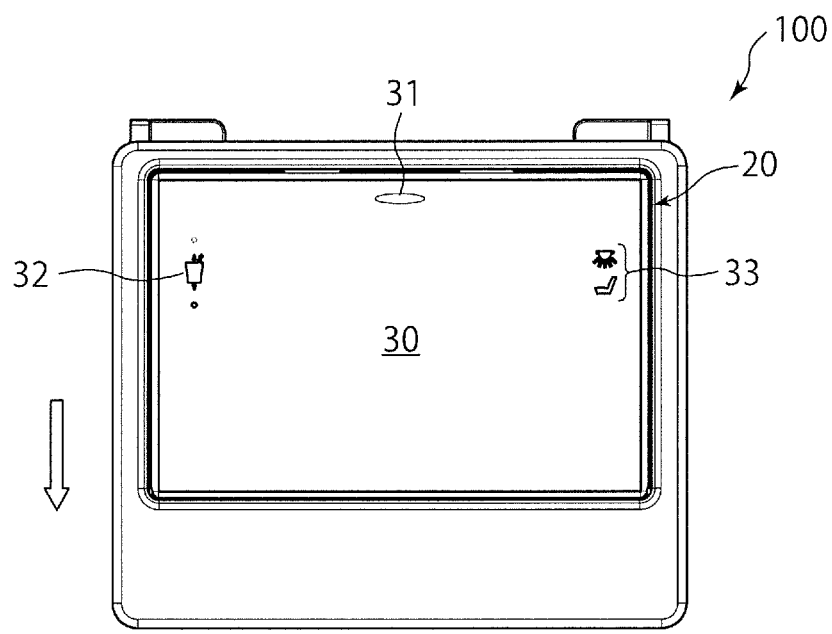
FIG. 7 is a diagram showing the state immediately after a touch operation for opening the lid is performed toward the opening/closing icon in the in-vehicle storage unit shown in FIG. 1.
Figure 8:
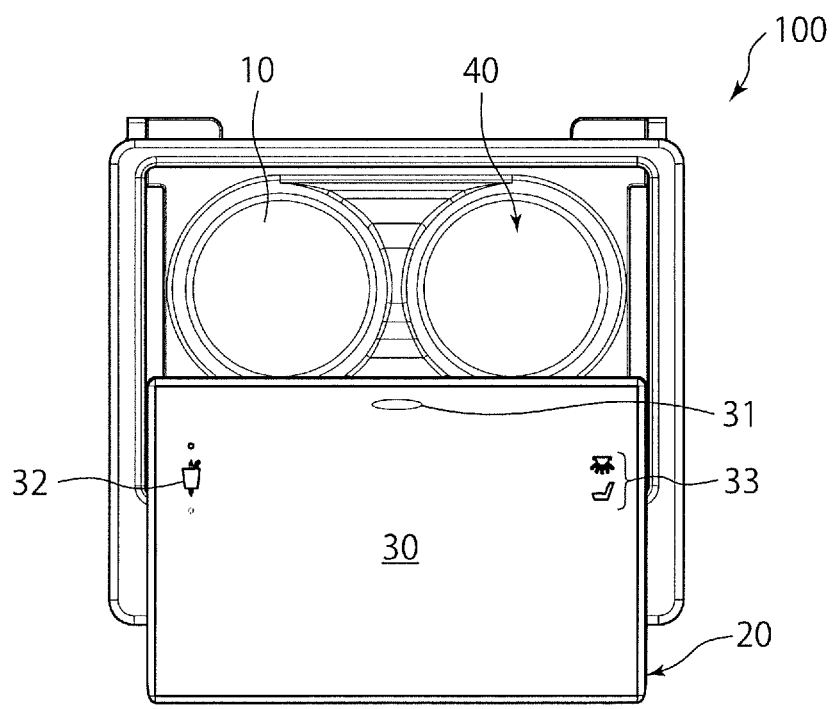
FIG. 8 is a schematic plan view of the in-vehicle storage unit shown in FIG. 1 in a case where the lid is in the open state.

FIG. 4 is a plan view of the in-vehicle storage unit 100 shown in FIG. 1 in the initial state. FIG. 5 is a diagram showing a state where the main icon 31 is displayed on the touch sensor panel 30 in the in-vehicle storage unit 100 shown in FIG. 1. FIG. 6 is a diagram showing a state where the opening/closing icon 32 and the in-vehicle item operation icon 33 are displayed on the touch sensor panel 30 in the in-vehicle storage unit 100 shown in FIG. 1. FIG. 7 is a diagram showing the state immediately after a touch operation for opening the lid 20 is performed toward the opening/closing icon 32 in the in-vehicle storage unit 100 shown in FIG. 1. FIG. 8 is a schematic plan view of the in-vehicle storage unit 100 shown in FIG. 1 in a case where the lid 20 is in the open state.

As shown in FIG. 4, the touch sensor panel 30 of this embodiment displays no icons and is entirely black (is blacked out) in the initial state, which is a state where the ignition of the vehicle is off.

When the ignition of the vehicle is switched on, as shown in FIG. 5, the horizontally oval main icon 31 is displayed (or lights up) in white at a front portion (an upper portion in FIG. 5) of the touch sensor panel 30.

In the display state shown in FIG. 5, when an operator performs a touch operation (tap operation) toward the main icon 31, the touch sensor panel 30 simultaneously displays the operation icons at two portions on the right and left sides on the touch sensor panel 30, as shown in FIG. 6, in accordance with a sensing signal of the touch operation. In this embodiment, the opening/closing icon 32 is displayed on the left side, and the in-vehicle item operation icon 33 is displayed on the right side. While these operation icons 32 and 33 are displayed, the main icon 31 is dimmed.

In the display state shown in FIG. 6, to shift the lid 20 from the closed state to the open state, the operator touches the opening/closing icon 32 with a finger, and moves the finger rearward (downward in FIG. 6) while keeping the finger on the opening/closing icon 32 (a swipe operation: a type of touch operation). After sensing the swipe operation as a touch operation toward the opening/closing icon 32, the touch sensor panel 30 causes a white round indicator to light up behind the opening/closing icon 32. (below the opening/closing icon 32 in FIG. 6), as shown in FIG. 7. Also, in accordance with a sensing signal of the swipe operation, the controller 60 installed in the lid 20 controls the opening/closing mechanism so that the lid 20 slides diagonally upward (see FIG. 2) while the surface of the lid 20 is maintained horizontally (without tilting), and further slides rearward (in the direction from lower left toward upper right in FIG. 2, or in a downward direction in FIG. 7). As a result of this, the lid 20 is put into the state shown in FIG. 8. In this manner, the surface (the touch sensor panel 30) of the lid 20 after opening or closing of the lid 20 remains parallel (substantially horizontal) to the surface of the lid 20 before the opening or closing of the lid 20.

In the state shown in FIG. 8, to return the lid 20 to the closed state, the operator touches the opening/closing icon 32 with a finger, and moves the finger forward (upward in FIG. 8) while keeping the finger on the opening/closing icon 32 (a swipe operation: a type of touch operation). After sensing the swipe operation as a touch operation toward the opening/closing icon 32, the touch sensor panel 30 causes a white round indicator to light up in front of the opening/closing icon 32 (above the opening/closing icon 32 in FIG. 8). In accordance with a sensing signal of the swipe operation, the controller 60 installed in the lid 20 controls the opening/closing mechanism 50, so that the lid 20 is returned to the closed state.

As for opening and closing of the lid 20, the fail-safe function to increase security in opening and closing the lid 20 is employed in this embodiment. That is, when sensing contact of the lid 20 with an obstacle while the lid 20 is being opened or closed, the controller 60 of this embodiment suspends the opening/closing operation of the lid 20, and controls the opening/closing mechanism 50 to return the lid 20 to the original state. For example, in a case where an operator performs a swipe operation to the opening/closing icon 32 to close the lid 20 while a beverage cup is in the storing portion 10, the lid 20 comes into contact with the beverage cup. In such a case, however, the controller 60 moves the lid 20 rearward, and returns the lid 20 to the open state (see FIG. 3).

Figure 10:
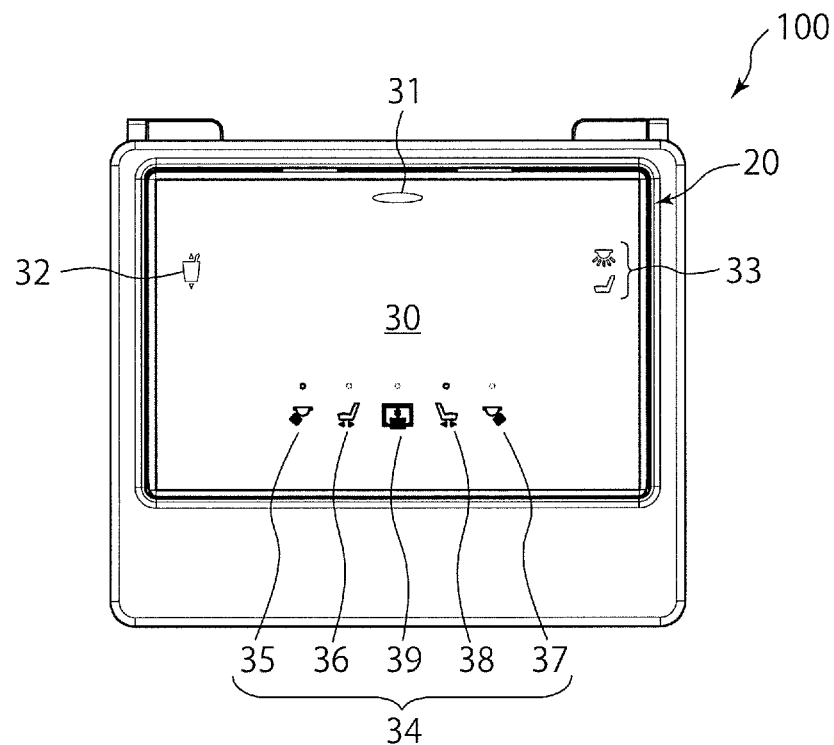
FIG. 10 is a diagram showing a state where a touch operation is performed toward a secondary operation icon in the in-vehicle storage unit shown in FIG. 1.

Referring next to FIGS. 9 and 10, a method of operating the in-vehicle item operation icon 33 is described. FIG. 9 is a diagram showing a state where the secondary operation icons 34 are displayed on the touch sensor panel 30 in the in-vehicle storage unit 100 shown in FIG. 1. FIG. 10 is a diagram showing a state where a touch operation is performed toward a secondary operation icon 34 in the in-vehicle storage unit 100 shown in FIG. 1.

In a state where the opening/closing icon 32 and the in-vehicle item operation icon 33 are displayed (see FIG. 6) on the touch sensor panel 30 of the in-vehicle storage unit 100 of this embodiment, when an operator performs a touch operation (tap operation) toward the in-vehicle item operation icon 33, the secondary operation icons 34 are displayed in a center region at a rear portion (a lower portion in FIG. 9) of the touch sensor panel 30, as shown in FIG. 9.

In this embodiment, the secondary operation icons 34 are displayed as follows: the left-side light operation icon 35 for operating the light for the left-side seat and the left-side seat operation icon 36 for adjusting the position of the left-side seat are displayed on the left side for the passenger in the seat to the left of the in-vehicle storage unit 100, and the right-side light operation icon 37 for operating the light for the right-side seat and the right-side seat operation icon 38 for adjusting the position of the right-side seat are displayed on the right side for the passenger in the seat to the right of the in-vehicle storage unit 100. Further, the sunshade operation icon 39 for opening and closing a sunshade is displayed between the left-side seat operation icon 36 and the right-side seat operation icon 38. In this embodiment, when the secondary operation icons 34 are displayed, the opening/closing icon 32 and the in-vehicle item operation icon 33 are dimmed.

For example, when the passenger in the seat to the left of the in-vehicle storage unit 100 performs a touch operation (tap operation) toward the left-side light operation icon 35, the light for the left-side seat provided in the vehicle is switched on. At this point, as shown in FIG. 10, a white round indicator is displayed in front of the left-side light operation icon 35 (above the left-side light operation icon 35 in FIG. 10). When the passenger again performs a touch operation (tap operation) toward the left-side light operation icon 35, the light for the left-side seat is switched off, and the indicator corresponding to the left-side light operation icon 35 is also turned off.

In this embodiment, the sunshade operation icon 39 is operated in the same manner as the left-side light operation icon 35. That is, to put the sunshade of the vehicle into an open state, an operator performs a touch operation (tap operation) toward the sunshade operation icon 39. To put the sunshade into a closed state, on the other hand, the operator again performs a touch operation (tap operation) toward the sunshade operation icon 39.

When the passenger in the seat to the right of the in-vehicle storage unit 100 performs a touch operation toward the right-side seat operation icon 38, for example, the position of the right-side seat in the vehicle is moved forward or rearward. Specifically, to move the position of the right-side seat in the vehicle forward, the operator (the passenger in the right-side seat) performs a rightward swipe operation to the right-side seat operation icon 38. To move the position of the right-side seat in the vehicle rearward, on the other hand, the operator (the passenger in the right-side seat) performs a leftward swipe operation to the right-side seat operation icon 38. In this embodiment, movement of the seat is determined in proportion to the intensity of a swipe operation to the right-side seat operation icon 38. Therefore, the operator moves the seat to a desired position by appropriately adjusting the intensity of a swipe operation to the right-side seat operation icon 38 and the number of times a swipe operation is to be performed toward the right-side seat operation icon 38. While the position of the seat is being moved forward or rearward, a white round indicator lights up in front of the right-side seat operation icon 38, as shown in FIG. 10. When the moving of the position of the seat is ended, the indicator is turned off.

In a case where the passenger in the seat to the left of the in-vehicle storage unit 100 is to move the position of the left-side seat in the vehicle forward or rearward, on the other hand, the directions of swipe operations corresponding to the directions of moving of the seat are the opposite of those in the above described case of swipe operations by the passenger in the seat to the right of the in-vehicle storage unit 100.

That is, to move the position of the seat forward, the operator (the passenger in the left-side seat) performs a leftward swipe operation to the left-side seat operation icon 36. To move the position of the seat rearward, the operator performs a rightward swipe operation to the left-side seat operation icon 36.

In the in-vehicle storage unit 100 of this embodiment, while the secondary operation icons 34 are displayed, the main icon 31, the opening/closing icon 32, and the in-vehicle item operation icon 33 are dimmed as described above. If a touch operation is performed toward the opening/closing icon 32 or the in-vehicle item operation icon 33 in this state, the secondary operation icons 34 are turned off, and the opening/closing icon 32 and the in-vehicle item operation icon 33 are brightly displayed (the dimmed state is canceled). That is, the state shown in FIG. 6 returns. If a touch operation is performed toward the main icon 31 in this state, the opening/closing icon 32 and the in-vehicle item operation icon 33 are turned off, and the main icon 31 is brightly displayed (the dimmed state is canceled). That is, the state shown in FIG. 5 returns. In a case where a touch operation is performed toward the main icon 31 while the secondary operation icons 34 are displayed, the secondary operation icons 34, the opening/closing icon 32, and the in-vehicle item operation icon 33 are all turned off, and the main icon 31 is brightly displayed (the dimmed state is canceled). That is, the state shown in FIG. 5 returns.

According to this embodiment described above, the operation icons are displayed on the touch sensor panel 30 in accordance with a sensing signal of a touch operation or after a touch operation serving as a trigger is performed. This prevents a touch operation toward any of the operation icons on the touch sensor panel 30 in the initial state. Thus, undesired opening and closing of the lid 20 can be prevented, for example. Further, as the touch sensor panel 30 is provided in the surface of the lid 20, high space efficiency can be achieved.

Further, before sensing a touch operation, the touch sensor panel 30 displays the main icon 31 on the touch sensor panel 30, and thus, can sense a touch operation toward the main icon 31 as the touch operation.

Because of this, the operation icons are not displayed on the touch sensor panel 30, even if a finger of an operator touches any portion other than the main icon 31. Thus, an undesired operation toward any of the operation icons can be avoided with a higher degree of certainty.

Further, the operation icons include the opening/closing icon 32, the lid 20 is connected to the opening/closing mechanism 50 that opens and closes the lid 20, and the touch sensor panel 30 is connected to the controller 60 that controls the opening/closing mechanism 50 in accordance with a sensing signal of a touch operation toward the opening/closing icon 32.

In such a structure, the lid 20 can be automatically opened or closed when an operator performs a touch operation toward the opening/closing icon 32.

Meanwhile, as the controller 60 is installed in the lid 20, the space efficiency of the in-vehicle storage unit 100 can be further increased.

Further, the touch sensor panel 30 includes a capacitor 70, and senses a touch operation from a change caused in the capacitance of the capacitor 70 when an operator touches the touch sensor panel 30 with a finger. Thus, the touch sensor panel 30 with a pleasing appearance can be provided.

Further, the operation icons include the in-vehicle item operation icon 33, and the touch sensor panel 30 displays the secondary operation icons 34 on the touch sensor panel 30, in accordance with a touch operation toward the in-vehicle item operation icon 33.

Because of this, the in-vehicle item operation icon 33 and the secondary operation icons 34 are displayed on the touch sensor panel 30 in a stepwise manner, and thus, an operator can perform a desired operation without confusion. Also, display with a pleasing appearance can be provided on the touch sensor panel 30.

Further, even when the lid 20 is in the open state, the surface of the lid 20 is exposed, and a touch operation toward the touch sensor panel 30 can be performed. Thus, whether the lid 20 is in the open state or in the closed state, a touch operation can be promptly performed toward the touch sensor panel 30.

In this case, the surface of the lid 20 after opening or closing of the lid 20 is substantially parallel to the surface of the lid 20 before the opening or closing of the lid 20, and thus, the touch sensor panel 30 can have excellent operability even when the lid 20 is in the open state.

Also, an in-vehicle armrest equipped with the above described in-vehicle storage unit 100 of this embodiment can have various kinds of operational functions, without losing the original function of the in-vehicle armrest.

In this embodiment, the left- and right-side light operation icons 35 and 37, the left- and right-side seat operation icons 36 and 38, and the sunshade operation icon 39 are employed as the secondary operation icons 34. However, the secondary operation icons 34 are not necessarily those icons, and may be secondary operation icons for operating any in-vehicle items such as an air conditioner and a seat heater.

Also, in this embodiment, the operation icons down to the secondary operation icons 34 are displayed in a stepwise manner as described above. However, it is possible to display third-order operation icons for performing more specific operations on the respective icons employed as the secondary operation icons 34. If necessary, it is possible to display operation icons on even lower orders in a stepwise manner.

Further, in this embodiment, when the lid 20 of the in-vehicle storage unit 100 is made to shift from the closed state to the open state, the lid 20 is made to slide diagonally upward while the surface of the lid 20 is maintained horizontally (without tilting), and further slide rearward. Thus, the operation icons can be operated even when the lid 20 is in the open state. However, as long as the operation icons can be operated when the lid 20 is in the open state (in a state where the surface of the lid 20 is horizontal or is slightly tilted with respect to horizontal lines), the lid 20 does not necessarily shift from the closed state to the open state in the above described mode. That is, while the lid 20 is shifting from the closed state to the open state, the surface of the lid 20 may be tilted, or the lid 20 may be rotatively moved.

Although the in-vehicle storage unit 100 of this embodiment is designed to be mounted in an in-vehicle armrest, the in-vehicle storage unit 100 is not necessarily mounted in an in-vehicle armrest, but can be suitably mounted in an instrument panel or a console of a vehicle, for example.

The invention claimed is:

1. An in-vehicle storage unit capable of storing an item to be stored in a vehicle, the in-vehicle storage unit comprising:
   a storing portion configured to store an item to be stored;
   an opening formed in the storing portion;
   a lid formed on the opening, the lid capable of being opened and closed; and
   a touch sensor panel capable of sensing a touch operation by an operator, the touch sensor panel forming substantially an entire surface of the lid, wherein
   the touch sensor panel displays an operation icon on the touch sensor panel, in accordance with a sensing signal of the touch operation, and
   the operation icon includes an opening/closing icon for automatically opening and closing the lid.

2. The in-vehicle storage unit according to claim 1, wherein, before sensing the touch operation, the touch sensor panel displays a main icon on the touch sensor panel, and is capable of sensing a touch operation toward the main icon as the touch operation.

3. The in-vehicle storage unit according to claim 1, wherein
   the lid is connected to an opening/closing mechanism configured to open and close the lid, and
   the touch sensor panel is connected to a controller configured to control the opening/closing mechanism in accordance with a sensing signal of a touch operation toward the opening/closing icon.

4. The in-vehicle storage unit according to claim 3, wherein the controller is installed in the lid.

5. The in-vehicle storage unit according to claim 1, wherein the touch sensor panel includes a capacitor, and senses the touch operation from a change caused in capacitance of the capacitor when an operator touches the touch sensor panel with a finger.

6. The in-vehicle storage unit according to claim 1, wherein
   the operation icon includes an in-vehicle item operation icon, and
   the touch sensor panel displays a secondary operation icon on the touch sensor panel, in accordance with a touch operation toward the in-vehicle item operation icon.

7. The in-vehicle storage unit according to claim 1, wherein, even when the lid is in an open state, the surface of the lid is exposed, to allow a touch operation toward the touch sensor panel.

8. The in-vehicle storage unit according to claim 1, wherein the surface of the lid after opening and closing of the lid is substantially parallel to the surface of the lid before the opening and closing of the lid.

* * * * *